United States Patent
Santra et al.

(10) Patent No.: US 7,527,098 B2
(45) Date of Patent: May 5, 2009

(54) METHODS OF INCREASING THE THICKENING TIMES OF PHOSPHATE-BASED CEMENTITIOUS COMPOSITIONS IN HIGH-TEMPERATURE WELLBORES

(75) Inventors: Ashok K. Santra, Duncan, OK (US); Russell M. Fitzgerald, Velma, OK (US)

(73) Assignee: Halliburton Energy Services, Inc., Duncan, OK (US)

(*) Notice: Subject to any disclaimer, the term of this patent is extended or adjusted under 35 U.S.C. 154(b) by 842 days.

(21) Appl. No.: 10/855,202

(22) Filed: May 27, 2004

(65) Prior Publication Data

US 2005/0263285 A1 Dec. 1, 2005

(51) Int. Cl.
*E21B 33/13* (2006.01)

(52) U.S. Cl. .................. 166/292; 166/293; 106/685; 106/690; 106/692; 106/792; 106/794; 106/801; 106/802; 106/819; 106/DIG. 1

(58) Field of Classification Search ............ 106/690, 106/685, 692, 792, 794, 801, 802, 819, DIG. 1; 166/292, 293
See application file for complete search history.

(56) References Cited

U.S. PATENT DOCUMENTS

| | | | |
|---|---|---|---|
| 3,960,580 A * | 6/1976 | Stierli et al. | |
| 4,436,555 A | 3/1984 | Sugama et al. | 106/85 |
| 4,676,832 A | 6/1987 | Childs et al. | 106/90 |
| 4,756,762 A * | 7/1988 | Weill et al. | |
| 4,786,328 A * | 11/1988 | Weill et al. | |
| 4,836,854 A * | 6/1989 | Bierman et al. | |
| 5,016,711 A | 5/1991 | Cowan et al. | 166/250 |
| 5,213,161 A | 5/1993 | King et al. | 166/293 |
| 5,220,960 A | 6/1993 | Totten et al. | 166/293 |
| 5,275,654 A | 1/1994 | Cowan | 106/661 |
| 5,281,270 A | 1/1994 | Totten et al. | 106/687 |
| 5,311,945 A | 5/1994 | Cowan et al. | 166/292 |
| 5,314,022 A | 5/1994 | Cowan et al. | |

(Continued)

FOREIGN PATENT DOCUMENTS

EP 0 582 367 A1 2/1994

(Continued)

OTHER PUBLICATIONS

Paper entitled "Magnesium Monophosphate Cements Derived From Diammonium Phosphate Solutions," by T. Sugama et al., Cement and Concrete Research, vol. 12, pp. 407-416, dated 1983.

(Continued)

*Primary Examiner*—Paul Marcantoni
(74) *Attorney, Agent, or Firm*—Craig W. Roddy; Conley Rose, P.C.

(57) ABSTRACT

A wellbore may be cemented by preparing a cementitious composition comprising water, a metal oxide or hydroxide compound, a phosphate compound, a borate compound, and a sugar, followed by displacing the cementitious composition into the wellbore. The metal oxide or hydroxide compound reacts with the phosphate compound in the wellbore to set into a hard mass. The synergistic effect of the borate compound and the sugar may increase a thickening time of the cementitious composition to in a range of from about 2 hours to about 11 hours at ambient temperatures in the wellbore. As such, the thickening time is sufficient to allow the cementitious composition to be placed in its desired location in the wellbore before setting.

15 Claims, 1 Drawing Sheet

U.S. PATENT DOCUMENTS

| | | | | |
|---|---|---|---|---|
| 5,322,124 | A | 6/1994 | Cowan et al. | 166/295 |
| 5,343,952 | A | 9/1994 | Cowan et al. | 166/295 |
| 5,379,840 | A | 1/1995 | Cowan et al. | 166/292 |
| 5,379,843 | A | 1/1995 | Unger et al. | 166/295 |
| 5,624,493 | A | 4/1997 | Wagh et al. | 106/817 |
| 5,645,518 | A * | 7/1997 | Wagh et al. | 588/252 |
| 5,718,757 | A | 2/1998 | Guillou et al. | |
| 5,830,815 | A * | 11/1998 | Wagh et al. | 501/155 |
| 5,846,894 | A * | 12/1998 | Singh et al. | 501/155 |
| 6,133,498 | A * | 10/2000 | Singh et al. | 588/3 |
| 6,204,214 | B1 * | 3/2001 | Singh et al. | 501/155 |
| 6,518,212 | B1 * | 2/2003 | Wagh et al. | 501/111 |
| 6,561,269 | B1 | 5/2003 | Brown et al. | 166/77.1 |
| 6,664,215 | B1 | 12/2003 | Tomlinson | 507/269 |
| 6,783,799 | B1 * | 8/2004 | Goodson | 427/140 |
| 7,204,880 | B1 * | 4/2007 | Turner et al. | 106/691 |
| 2006/0131019 | A1 * | 6/2006 | Santra et al. | 166/292 |

OTHER PUBLICATIONS

Paper entitled "Chemical reactions between magnesia and aluminum orthophosphate to form magnesia-phosphate cements," by T. Finch et al., Journal of Materials Science, pp. 4379-4386, dated 1989.

Paper entitled "Cold-Setting Properties," by William D. Kingery, Journal of The American Ceramic Society, vol. 33, pp. 242-247.

Foreign communication from a related counterpart application dated Sep. 26, 2005.

* cited by examiner

METHODS OF INCREASING THE THICKENING TIMES OF PHOSPHATE-BASED CEMENTITIOUS COMPOSITIONS IN HIGH-TEMPERATURE WELLBORES

FIELD OF THE INVENTION

The present invention generally relates to well cementing, and more particularly to methods of lengthening the thickening times of phosphate-based cementitious compositions in relatively high-temperature wellbores by including a borate compound and a sugar in the compositions.

BACKGROUND OF THE INVENTION

A natural resource such as oil or gas residing in a subterranean formation can be recovered by drilling a well into the formation. The subterranean formation is usually isolated from other formations using a technique known as well cementing. In particular, a wellbore is typically drilled down to the subterranean formation while circulating a drilling fluid through the wellbore. After the drilling is terminated, a string of pipe, e.g., casing, is run in the wellbore. Primary cementing is then usually performed whereby a cement slurry is pumped down through the string of pipe and into the annulus between the string of pipe and the walls of the wellbore to allow the cement slurry to set into an impermeable cement column and thereby seal the annulus. Secondary cementing operations may also be performed after the primary cementing operation. One example of a secondary cementing operation is squeeze cementing whereby a cement slurry is forced under pressure to areas of lost integrity in the annulus to seal off those areas.

Phosphate-based cementitious compositions are commonly used in primary and secondary cementing operations to form quick setting, strong cement that binds well to the subterranean formation and to itself. The phosphate-based cementitious compositions may be formed by combining together the following reactants: a metal oxide or hydroxide compound such as magnesium oxide; a phosphate compound such as potassium hydrophosphate; and water. The resulting reaction is fast such that the cementitious compositions set very rapidly, e.g., within a few minutes at room temperature and pressure. The rate of reaction further increases as the temperature increases. As such, the thickening times of the compositions may be unacceptably short to allow them to be pumped to their desired downhole locations, making the use of such compositions in well cementing a challenge. As a result, the drill pipe or the tool used to lower the piping in the wellbore may be cemented in place, causing several weeks of delay in the completion of the wellbore.

One method commonly employed to lengthen the thickening time of phosphate-based cementitious compositions is to introduce boric acid or salts thereof to the compositions, thereby delaying the rate of reaction. As a result, the thickening time of the phosphate-based cementitious compositions may endure for as long as 3 to 4 hours when used in a wellbore having a relatively low bottom hole static temperature. However, at higher temperatures, the thickening time of the phosphate-based cementitious compositions is still insufficient to allow for proper placement downhole. A need therefore exists to develop methods of reducing the thickening time of such phosphate-based cementitious compositions when they are exposed to relatively high downhole temperatures and pressures.

SUMMARY OF THE INVENTION

A wellbore may be cemented by preparing a cementitious composition comprising water, a metal oxide or hydroxide compound, a phosphate compound, a borate compound, and a sugar, followed by displacing the cementitious composition into the wellbore. The metal oxide or hydroxide compound reacts with the phosphate compound in the wellbore to set into a hard mass. The metal oxide or hydroxide compound contained in the cementitious composition may be, for example, magnesium oxide calcined at a temperature greater than or equal to about 3,632° F., which reacts at a relatively slow rate with the phosphate compound. The synergistic effect of the borate compound and the sugar may increase a thickening time of the cementitious composition to in a range of from about 2 hours to about 11 hours at ambient temperatures in the wellbore. In an embodiment, the ambient temperatures may be in a range of from about 150° F. to about 200° F. As such, the thickening time is sufficient to allow the cementitious composition to be placed in its desired location in the wellbore before setting.

DETAILED DESCRIPTION OF THE PREFERRED EMBODIMENTS

Figure 1:
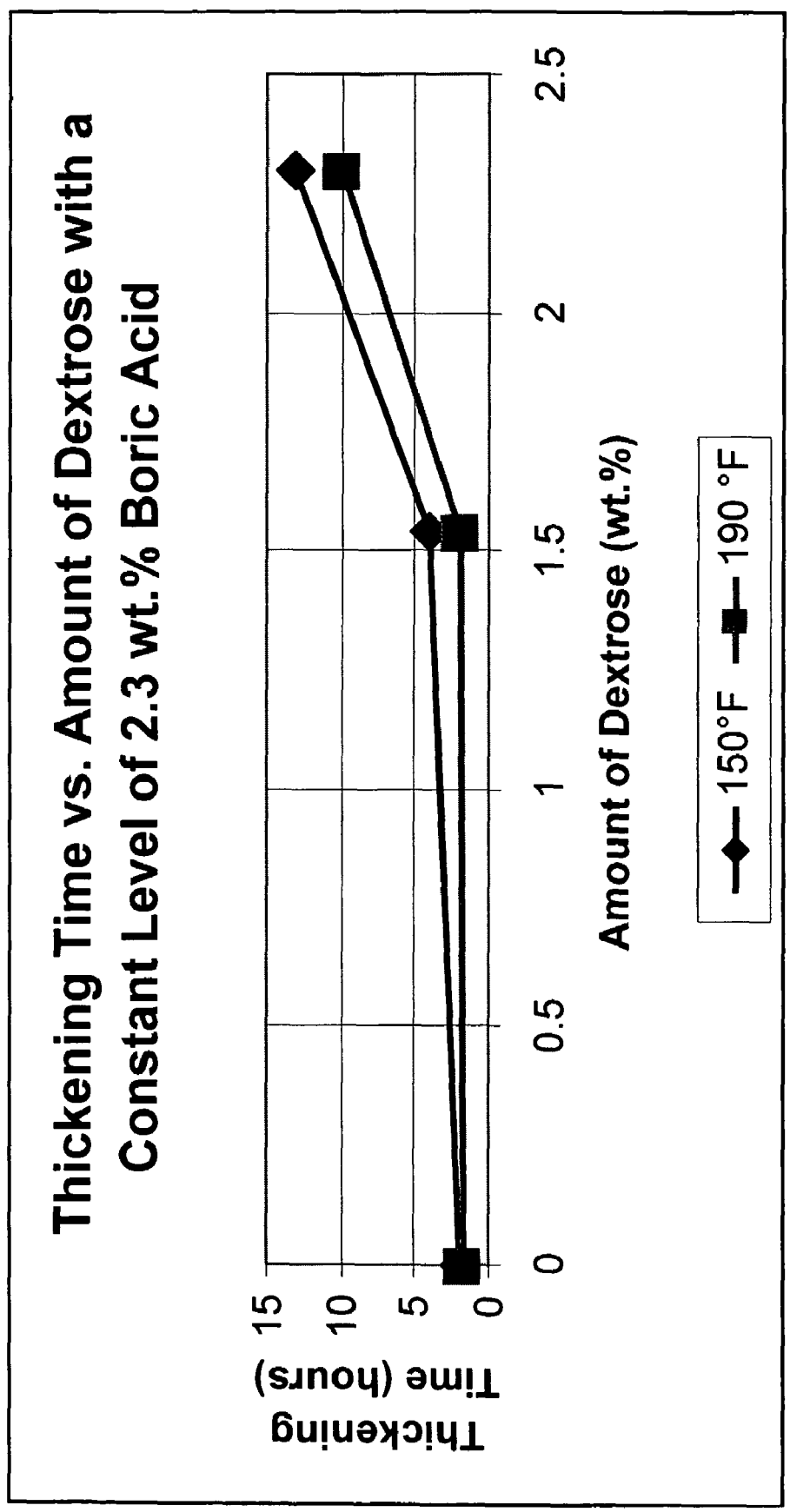
FIG. 1 is a graph of the thickening time of a phosphate-based cementitious composition as a function of the amount of sugar, i.e., dextrose, contained in the composition while maintaining a constant amount of boric acid in the composition.

At least one borate compound and at least one sugar may be included in phosphate-based cementitious compositions to synergistically increase the thickening time thereof. As used herein, "thickening time" refers to the duration that a cementitious composition remains in a fluid state such that it is capable of being pumped downhole. Due to the combined presence of the borate compound and the sugar, the thickening time of the phosphate-based cementitious compositions is sufficient to allow the compositions to be pumped to their desired locations in wellbores having relatively high temperatures and pressures.

The phosphate-based cementitious compositions may be formed by combining a metal oxide or hydroxide compound, a phosphate compound, a borate compound, and sugar with water, thereby forming a slurry that may be pumped into a wellbore. The various components in the cementitious compositions may be combined in any order and thoroughly mixed using equipment known to one skilled in the art, such as blenders and mixers. In an embodiment, a shear rate in a range of from about 1,500 rpm to about 4,000 rpm is used to mix the components. In an embodiment, all of the components except water may be dry mixed together before adding them to the water to form the slurry. The metal oxide or hydroxide compound and the phosphate compound react to form a hard mass or solid that is usually impermeable to fluid. In embodiments in which the cementitious compositions comprise MgO (i.e., the metal oxide) and $KH_2PO_4$ (i.e., the phosphate compound), the following equation represents the reaction that occurs:

$$MgO + KH_2PO_4 + H_2O \rightarrow MgKPO_4 \cdot 6H_2O$$

It is believed that the synergistic effect of the borate compound and the sugar reduces the rate of this reaction at ambient temperatures in a wellbore, thus increasing the thickening time of the cementitious compositions. Such ambient temperatures are typically in a range of from about 70° F. to about 200° F. In embodiments, the thickening time of the cementitious compositions is in a range of from about 2 hours to about 11 hours, alternatively from about 3 hours to about 5 hours even when ambient temperatures in the wellbore are in a range of from about 150° F. to about 200° F.

A metal oxide or hydroxide compound that does not react uncontrollably may be employed in the cementitious compositions. The metal oxide or hydroxide compound is desirably insoluble or exhibits a relatively low solubility in water such that the borate compound may adsorb or react at the surface of its particles. Examples of suitable metal oxide or hydroxide compounds include but are not limited to MgO, MnO, $Al(OH)_3$, $Al_2O_3$, FeO, $Fe_2O_3$, ZnO, $Zr(OH)_4$, $ZrO_2$, $Y_2O_3$, $La_2O_3$, $VO_3$, CrO, CaO, CoO, PbO, $Nd_2O_3$, TlO, $TiO_2$, $CaSiO_3$, crushed dibasic sodium phosphate crystals mixed with magnesium oxide, and combinations thereof. In an embodiment, MgO that has been calcined at a temperature greater than or equal to about 3,632° F. is used in the cementitious compositions. This type of MgO reacts slowly, further contributing to the increase in the thickening time of the cementitious compositions. A suitable MgO of this type is commercially available from Halliburton Energy Services, Inc. under the tradename MICROBOND-HT magnesium oxide. The amount of the metal oxide or hydroxide compound present in the cementitious compositions may be selected based on the stoichiometry of the reaction between it and the phosphate compound. In embodiments, the amount of the metal oxide or hydroxide is in a range of from about 6.5% to about 16.5%, from about 8.5% to about 14.5%, or from about 10.5% to about 12.5%, all percentages being by total weight of the original solids present in the cementitious compositions. As used herein, "original solids" refers to all of the solids present except the sugar and the borate compound.

As used herein, a phosphate compound refers to a compound that serves as a source of a phosphate ion. The phosphate compound used in the cementitious compositions is desirably soluble in water. Suitable phosphate compounds for use in the cementitious compositions may be generally represented by the following formula:

$$A_{3-x}(H_xPO_4)$$

where A=hydrogen, an alkali metal, or an ammonium ion, x=a number in a range of from 1 to 3.

In embodiments, the phosphate compound comprises $H_3PO_4$, $(NH_4)_2HPO_4$, $(NH_4)H_2PO_4$, $Al(H_2PO_4)_3$, $KH_2PO_4$, $NaH_2PO_4$, or combinations thereof. The amount of the phosphate compound present in the cementitious composition may be selected based on the stoichiometry of the reaction between it and the metal oxide or hydroxide compound. In embodiments, the amount of the phosphate compound is in a range of from about 33.5% to about 43.5%, from about 35.5% to about 41.5%, or from about 37.5% to about 39.5%, all percentages being by total weight of the original solids present in the cementitious compositions. Additional disclosure regarding the use of oxide or hydroxide compounds and phosphate compounds in cementitious compositions can be found in U.S. Pat. Nos. 6,561,269, 6,204,214, 4,786,328, 4,756,762, and 3,960,580, each of which is incorporated by reference herein in its entirety.

Borate compounds and sugars suitable for synergistically achieving cementitious compositions having the properties described herein may be employed. The borate compound is desirably soluble in water. As used herein, a borate compound refers to boric acid or a salt of boric acid such as sodium borate (i.e., borax); sodium, potassium, lithium, and ammonium pentaborates, tetraborates, octaborates, biborates; or combinations thereof. Examples of suitable sugars include sucrose, lactose, dextrose, or combinations thereof. The amount of the borate compound present in the cementitious compositions may be in a range of from about 0.1% to about 10%, from about 1% to about 4%, or from about 2% to about 3%, all percentages being by the total weight of the original solids present in the cementitious compositions. Further, the amount of the sugar present in the cementitious compositions may be in a range of from about 0.1% to about 10%, from about 1% to about 3%, or from about 1.5% to about 2%, all percentages being by the total weight of the original solids present in the cementitious compositions.

An effective amount of water to form a pumpable slurry may be included in the cementitious compositions. The water may be fresh water or salt water, e.g., an unsaturated aqueous salt solution or a saturated aqueous salt solution such as brine or seawater. In embodiments, the amount of the water present in the cementitious composition is in a range of from about 25.5% to about 35.5%, from about 27.5% to about 33.5%, or from about 29.5% to about 31.5%, all percentages being by total weight of the original solids present in the cementitious compositions.

The cementitious compositions optionally may also include an inert filler material to reduce the amount of the other components required, which are more expensive than the filler material. The filler material may be a particulate material. Examples of suitable filler materials include fly ash class F (commercially available as POZMIX A fly ash from Halliburton Energy Services, Inc.), aluminum oxides such as alumina ($Al_2O_3$), silicon dioxide ($SiO_2$), calcium carbonate, iron oxide, manganese oxide, and combinations thereof. The amount of the filler material present in the cementitious compositions may be in a range of from about 0% to about 60%, from about 45% to about 55%, or from about 48% to about 52%, all percentages being by total weight of the original solids present in the cementitious compositions.

As deemed appropriate by one skilled in the art, additional additives may be added to the cementitious compositions for improving or changing the properties thereof. Examples of such additives include but are not limited to set retarders, fluid loss control agents, defoamers, dispersing agents, weighting agents, and formation conditioning agents.

The foregoing cementitious compositions may be used in various cementing operations performed in a wellbore. In one embodiment, the cementitious compositions may be employed in primary cementing. Primary cementing first involves drilling a wellbore to a desired depth such that the wellbore penetrates a subterranean formation while circulating a drilling fluid through the wellbore. Subsequent to drilling the wellbore, at least one conduit such as a casing may be placed in the wellbore while leaving a space known as the annulus between the wall of the conduit and the wall of the wellbore. The drilling fluid may then be displaced down through the conduit and up through the annulus one or more times, for example, twice, to clean out the hole. A cementitious composition then may be conveyed downhole and up through the annulus, thereby displacing the drilling fluid from the wellbore. As discussed previously, the thickening time of the cementitious composition is long enough to allow it to be pumped to and placed within the annulus. Due to the reaction between the phosphate compound and the metal oxide or hydroxide compound, the cementitous composition sets into a hard mass, forming a cementitious column that isolates an adjacent portion of the subterranean formation and provides support to the adjacent conduit.

In another embodiment, the cementitious compositions may be employed in a secondary cementing operation such as squeeze cementing, which is performed after the primary cementing operation. In squeeze cementing, a cementitious composition is forced under pressure into permeable zones through which fluid can undesirably migrate in the wellbore. Examples of such permeable zones include fissures, cracks, fractures, streaks, flow channels, voids, high permeability streaks, annular voids, or combinations thereof. The permeable zones may be present in the cementitious column residing in the annulus, a wall of the conduit in the wellbore, a microannulus between the cementitious column and the subterranean formation, and/or a microannulus between the cementitious column and the conduit. The thickening time of the cementitious composition is relatively long such that the composition may be properly placed in the permeable zones. As a result of the reaction between the phosphate compound and the metal oxide or hydroxide compound, the cementitious composition sets within the permeable zones, thereby forming a hard mass to plug those zones and prevent fluid from leaking therethrough.

EXAMPLES

The invention having been generally described, the following examples are given as particular embodiments of the invention and to demonstrate the practice and advantages hereof. It is understood that the examples are given by way of illustration and are not intended to limit the specification or the claims to follow in any manner. In the following examples, the cementitious compositions were prepared and tested in accordance with procedures described in the American Petroleum Institute (API) Specification 10B, 22nd Edition, December, 1997. Further, all percentages are by total weight of the MgO, the $KH_2PO_4$, and the POZMIX A fly ash.

Example 1

Three samples of cementitious compositions or slurries were prepared that contained varying amounts of boric acid and no sugar, as shown in Table 1 below. Each sample further contained 11.5% MgO, 38.5% $KH_2PO_4$, 50% pozzolan-A, 30.8% water. The thickening time of each sample was measured using an HP-HT consistometer at a temperature of 190° F. and a pressure of 3,000 psi. As specified in the foregoing API procedure, the thickening time was determined to be the elapsed time from the initial application of the temperature and the pressure to the time at which the slurry reaches a consistency deemed sufficient to make it unpumpable (i.e., 70 Bc). The results of these measurements are shown in Table 1 below.

TABLE 1

| Sample No. | Amount of Boric Acid, % | Amount of Dextrose, % | Temperature, ° F. | Thickening Time, hr.:min. |
| --- | --- | --- | --- | --- |
| 1 | None | None | 190 | 0:10 |
| 2 | 1.54 | None | 190 | 0:40 |
| 3 | 2.3 | None | 190 | 1:40 |

Based on the results depicted in Table 1, the thickening time of the cementitious composition samples increased by relatively small amounts as the amount of boric acid used therein was increased.

Example 2

The same procedure followed in Example 1 was used to prepare and test two cementitious composition samples with the exception that varying amounts of dextrose were used and no boric acid was employed, as shown in Table 2 below. The thickening times of these examples are also depicted in Table 2.

TABLE 2

| Sample No. | Amount of Boric Acid, % | Amount of Dextrose, % | Temperature, ° F. | Thickening Time, hr.:min. |
| --- | --- | --- | --- | --- |
| 4 | None | None | 190 | 0:10 |
| 5 | None | 2.3 | 190 | 0:10 |

The results in Table 2 indicate that using dextrose in the absence of boric acid did not affect the thickening time of the samples at 190° F. and a dextrose concentration even as high as 2.3%.

Example 3

The same procedure followed in Example 1 was followed to prepare and test two cementitious composition samples with the exception that varying amounts of dextrose and 2.3% boric acid were used, as shown in Table 3 below. Also, the thickening time of each sample was measured at a temperature of 150° F. and at 190° F. under a pressure of 3,000 psi. The results of these measurements are presented in Table 3. In addition, FIG. 1 depicts a plot of the thickening time as a function of the amount of dextrose used at both 150° F. and 190° F.

TABLE 3

| Sample No. | Amount of Boric Acid, % | Amount of Dextrose, % | Temperature, ° F. | Thickening Time, hr.:min. |
| --- | --- | --- | --- | --- |
| 6 | 2.3 | 1.54 | 150 | 4:00 |
| 7 | 2.3 | 2.3 | 150 | 13:00 |
| 8 | 2.3 | 1.54 | 190 | 2:00 |
| 9 | 2.3 | 2.3 | 190 | 11:00 |

As illustrated by FIG. 1 and Table 3, while dextrose alone did not increase the thickening time of phosphate-based cementitious compositions, it worked synergistically with the boric acid to retard the thickening of such cementitious compositions even at higher temperatures and pressures. In particular, the thickening time increased significantly as the amount of dextrose in the cementitious composition samples was increased at both 150° F. and 190° F. Further, the thickening times of these samples containing the boric acid and the dextrose were much longer than those of the samples in Example 1 containing only boric acid at 190° F.

Example 4

Five samples of cementitious compositions or slurries were prepared that contained varying amounts of borax ($Na_2B_4O_7$, $10H_2O$) and dextrose, as shown in Table 4 below. Each sample further contained 11.5% MgO, 38.5% $KH_2PO_4$, 50% POZMIX A fly ash, and 30.8% water. The thickening time of each sample was measured using an HP-HT consistometer at a temperature of 190° F. and a pressure of 3,000 psi. The results are shown in Table 4 below.

TABLE 4

| Sample No. | Amount of Borax, % | Amount of Dextrose, % | Temperature, ° F. | Thickening Time, hr.:min. |
|---|---|---|---|---|
| 10 | 0 | 2.3 | 190 | 0:10 |
| 11 | 2.3 | 0 | 190 | 0:60 |
| 12 | 2.3 | 2.3 | 190 | 1:55 |
| 13 | 3.06 | 0 | 190 | 2:5 |
| 14 | 3.06 | 2.3 | 190 | 3:20 |

Table 4 indicates that the thickening times of the samples containing both borax and dextrose were significantly longer than the ones containing the same amount of only borax or dextrose at the high temperature and pressure. In view of the foregoing results, the amount of boric acid or salt of boric acid and the amount of sugar used in a phosphate-based cementitious composition may be adjusted to ensure that the composition can be placed at its desired location in a wellbore, even if ambient temperatures and pressures therein are relatively high.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Use of the term "optionally" with respect to any element of a claim is intended to mean that the subject element is required, or alternatively, is not required. Both alternatives are intended to be within the scope of the claim.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of a reference herein is not an admission that it is prior art to the present invention, especially any reference that may have a publication date after the priority date of this application. The disclosures of all patents, patent applications, and publications cited herein are hereby incorporated by reference, to the extent that they provide exemplary, procedural, or other details supplementary to those set forth herein.

What is claimed is:

1. A method of cementing a wellbore, comprising:
   (a) preparing a cementitious composition comprising water, a metal oxide or hydroxide compound, a phosphate compound, a borate compound, and a sugar, wherein the metal oxide or hydroxide compound is in a range of from about 6.5% to 16.5% by total weight of the original solids present in the cementitious composition and wherein an amount of the sugar present in the cementitious composition is in a range of from 1.5% to about 10% by total weight of the original solids present in the cementitious composition; and
   (b) placing the cementitious composition into the wellbore.

2. The method of claim 1, wherein a thickening time of the cementitious composition is in a range of from about 2 hours to about 11 hours at ambient temperatures in the wellbore.

3. The method of claim 2, wherein the ambient temperatures are in a range of from about 150° F. to about 200° F.

4. The method of claim 1, wherein a thickening time of the cementitious composition is in a range of from about 3 hours to about 5 hours at ambient temperatures in the wellbore.

5. The method of claim 4, wherein the ambient temperatures are in a range of from about 150° F. to about 200° F.

6. The method of claim 1, wherein the metal oxide or hydroxide compound comprises MgO, MnO, Al(OH)$_3$, Al$_2$O$_3$, FeO, Fe$_2$O$_3$, ZnO, Zr(OH)$_4$, ZrO$_2$, Y$_2$O$_3$, La$_2$O$_3$, VO$_3$, CrO, CaO, CoO, PbO, Nd$_2$O$_3$, TlO, TiO$_2$, CaSiO$_3$, crushed dibasic sodium phosphate crystals mixed with magnesium oxide, or combinations thereof.

7. The method of claim 1, wherein the metal oxide or hydroxide compound comprises MgO calcined at greater than or equal to about 3,632° F.

8. The method of claim 1, wherein the phosphate compound is generally represented by the following formula:

$$A_{3-x}(H_xPO_4)$$

wherein A=hydrogen, an alkali metal, or an ammonium ion, x=a number in a range of from 1 to 3.

9. The method of claim 1, wherein the phosphate compound comprises H$_3$PO$_4$, (NH$_4$)$_2$HPO$_4$, (NH$_4$)H$_2$PO$_4$, Al(H$_2$PO$_4$)$_3$, KH$_2$PO$_4$, NaH$_2$PO$_4$, or combinations thereof.

10. The method of claim 1, wherein the borate compound comprises boric acid, a salt of boric acid, or combinations thereof.

11. The method of claim 1, wherein the borate compound comprises sodium borate.

12. The method of claim 1, wherein the sugar comprises dextrose, lactose, sucrose, or combinations thereof.

13. The method of claim 1, wherein an amount of the borate compound present in the cementitious composition is in a range of from about 0.1% to about 10% by total weight of the original solids present in the cementitious composition.

14. The method of claim 1, wherein the cementitious composition further comprises a filler material.

15. The method of claim 14, wherein the filler material comprises fly ash class F, alumina, silicon dioxide, calcium carbonate, iron oxide, manganese oxide, or combinations thereof.

* * * * *